United States Patent [19]
Goldenberg

[11] Patent Number: 5,848,719
[45] Date of Patent: Dec. 15, 1998

[54] BATTERY COVER LATCH

[75] Inventor: Michael P. Goldenberg, Delray, Fla.

[73] Assignee: Motorola, Inc., Schaumburg, Ill.

[21] Appl. No.: 850,696

[22] Filed: May 2, 1997

[51] Int. Cl.[6] .............................. B65D 43/20; B65D 45/22
[52] U.S. Cl. ...................... 220/326; 220/281; 220/345.3
[58] Field of Search .................................. 220/315, 324, 220/326, 345, 345.1, 345.2, 345.3, 345.4, 281, 350, 351; 292/8, 10, 28, 32, 95, 137, 302

[56] References Cited

U.S. PATENT DOCUMENTS

| | | | |
|---|---|---|---|
| 1,548,644 | 8/1925 | Wiley | 292/95 |
| 3,987,891 | 10/1976 | Horvath | 220/345.3 X |
| 4,390,198 | 6/1983 | Selinko . | |
| 4,391,883 | 7/1983 | Williamson et al. . | |
| 4,688,023 | 8/1987 | McGill et al. | 220/345.4 X |
| 4,880,712 | 11/1989 | Gordecki . | |
| 5,135,822 | 8/1992 | Okamoto . | |
| 5,206,098 | 4/1993 | Cho et al. . | |
| 5,244,755 | 9/1993 | Benoist et al. . | |
| 5,270,702 | 12/1993 | Krolak . | |
| 5,307,511 | 4/1994 | Takahashi . | |
| 5,331,506 | 7/1994 | Nakajima . | |
| 5,372,395 | 12/1994 | Yang . | |
| 5,415,315 | 5/1995 | Ramirez | 220/345.2 |
| 5,508,124 | 4/1996 | Gordecki et al. . | |

*Primary Examiner*—Stephen Castellano
*Assistant Examiner*—Niki M. Eloshway

[57] ABSTRACT

A housing (12) for a portable electronic device (10) has a battery compartment cover (14) and a latch (20). The latch has a cantilevered beam (42) that rotates about a base (40) fixed to the housing. The cover has a notch (38) on an inner surface (36). An engagement end (44) of the cantilevered beam rotates into the notch for securing the cover to the housing. Application of an external force on the cover approximately opposite the latch in a direction toward the latch causes the engagement end of the cantilevered beam to rotate out of the notch to disengage the latch. Application of an external force on the cover in a direction only toward an opened position for the cover causes the latch to engage the cover with more force.

17 Claims, 6 Drawing Sheets

SECTION 1-1

SECTION 2-2

BATTERY COVER LATCH

FIELD OF THE INVENTION

This invention relates in general to battery cover latches and more particularly to latches for battery covers of portable electronic devices.

BACKGROUND OF THE INVENTION

Typical portable electronic devices have removable covers that permit access to batteries, fuses, etc., from a compartment within the device. There is a need for such covers to be removed regularly, and attempts have been made to design covers that are easy to attach and remove. Unfortunately, some existing designs that simplify the operations of removal and attachment do so at the expense of ruggedness and/or can disadvantageously allow accidental dislodgement of the cover as a result of mechanical shock or even as a result of normal use of the portable electronic device. Such accidental dislodgment can result in loss of a cover and/or the loss of the contents of the compartment that the cover was intended to retain. Some prior art covers are designed to have freedom of movement in one direction when installed, which is resisted by a detent system. As a removal force is applied in a removal direction, the detent is displaced and the cover dislodges. Obviously, a shock impulse in the removal direction disadvantageously effects the same outcome. Two prior art designs have tried to solve this problem. The first requires increasing the detent force by either increasing the detent engagement or stiffening the surrounding structure to increase its displacement force. At some point, increasing the detent force solves the accidental dislodging problem but makes the door very difficult to remove. The second prior art design was to add a secondary latch movable into a position to block the path of the cover's motion. The disadvantages of the second design are added product cost and requiring the user to activate the secondary latch.

Thus, what is needed is a removable cover with a latching system that locks positively into place automatically, resists accidental unlatching, yet is unlatched easily.

DESCRIPTION OF THE PREFERRED EMBODIMENT

Figure 1:
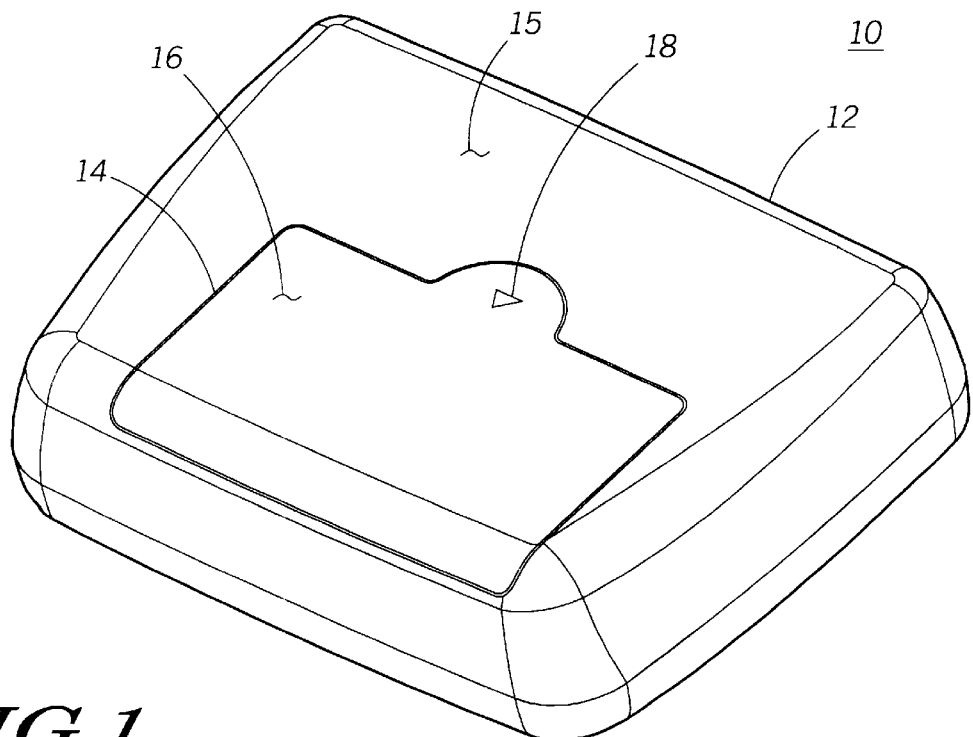
FIG. 1 is a perspective view of a housing for a portable electronic device showing a battery cover in a closed position.
Figure 2:
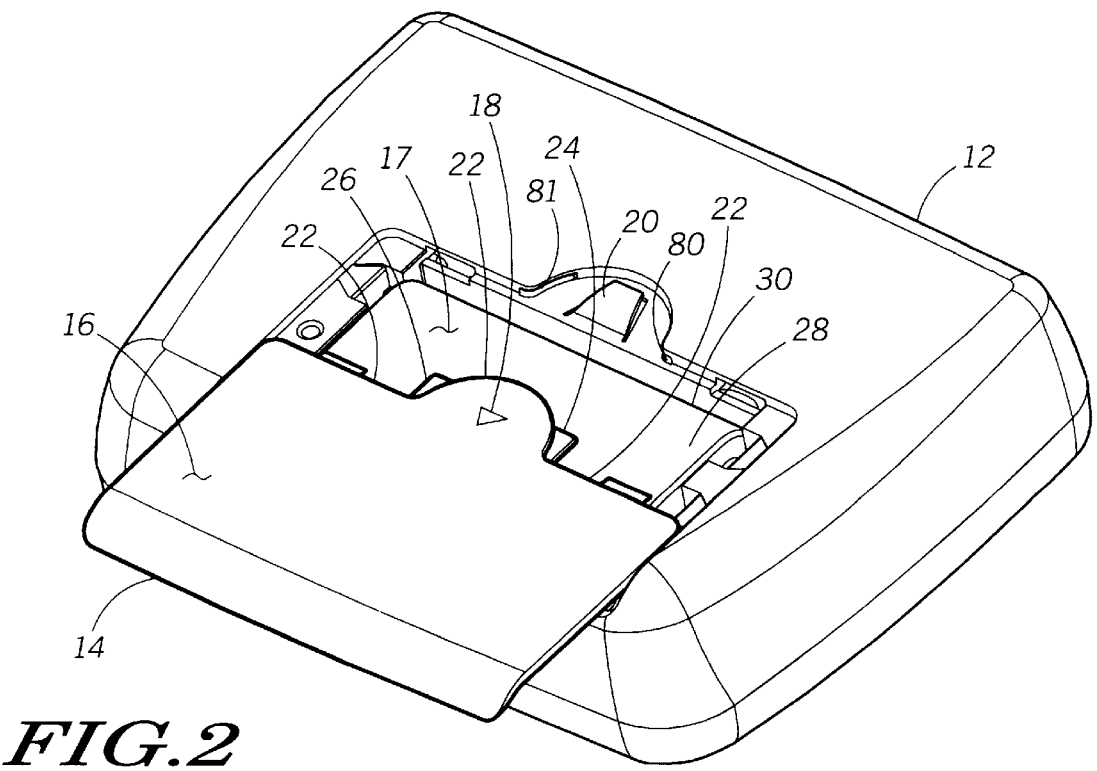
FIG. 2 is a perspective view of the housing of FIG. 1 showing the battery door in an opened position.

Referring to FIG. 1, a perspective view of a portable electronic device 10 is shown. The portable electronic device 10, such as a selective call transceiver or pager, comprises a housing 12 and a cover 14 on a side 15 of the housing. The cover has an outside surface 16, an inside surface (not shown in FIG. 1), and a cosmetic feature, preferably an indentation 18, on the outside surface. The housing 12 and cover 14 are preferably of plastic material. The cover 14 is shown in a closed position. FIG. 2 is a perspective view of the portable electronic device 10 of FIG. 1, with the cover 14 in an opened position, thereby exposing, through an opening 17, a compartment 28 within the housing 12 for holding, for example, a battery 30. The cover has a leading edge 22. A flange 24 and a flange 26 are attached to the inside surface of the cover and extend beyond the leading edge of the cover 14. Opening 80 and opening 81 in the housing are sized to accept flange 24 and flange 26, respectively. A latch 20 in accordance with the invention is attached to the housing 12. Preferably, the latch is made of plastic and is molded together with the housing.

Figure 3:
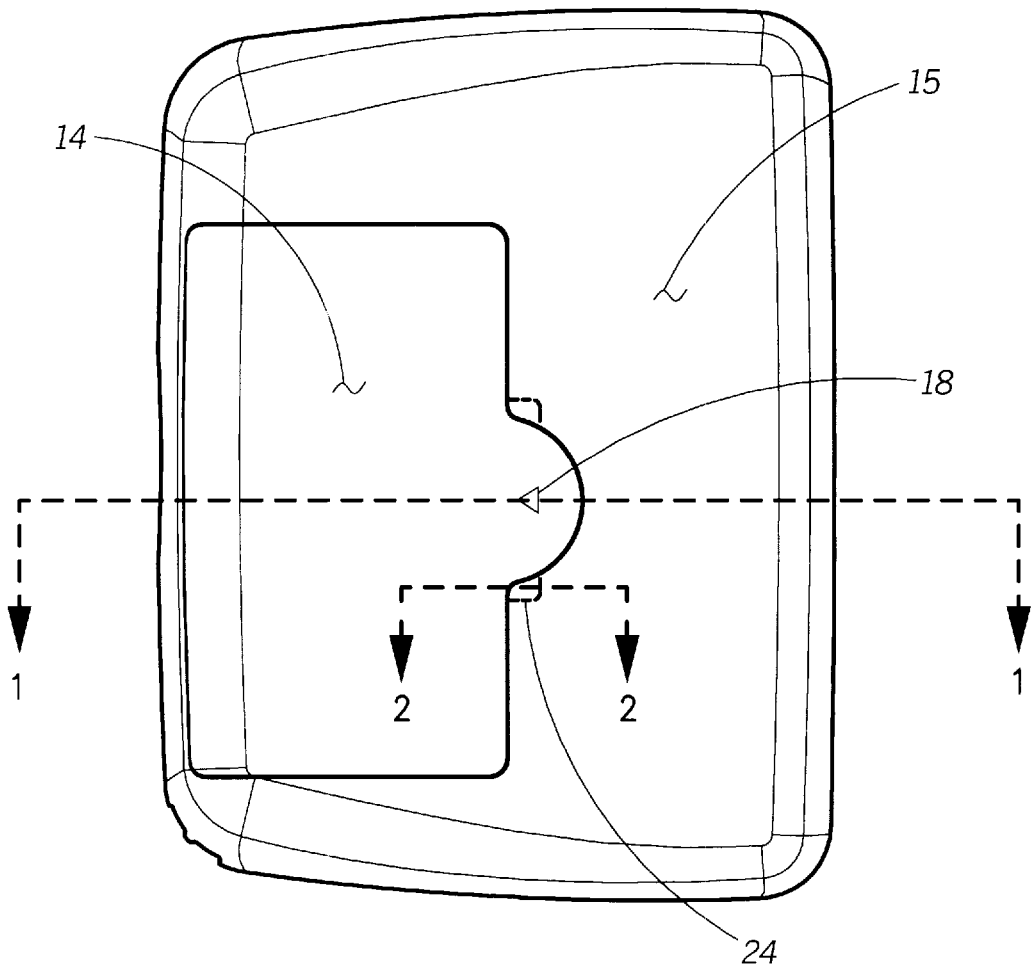
FIG. 3 is a plan view of a side of the housing of FIG. 1 showing the battery cover in the closed position.
Figure 4:
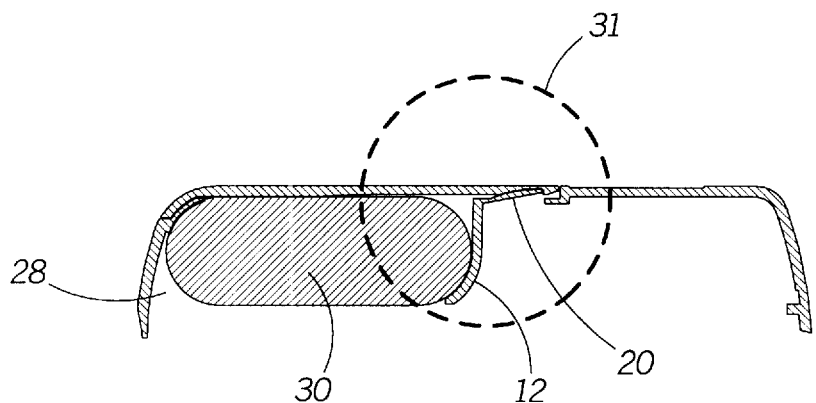
FIG. 4 is a cross-sectional view of the housing through cut line 1—1 of FIG.3.

FIG. 3 is a plan view of side 15 of the housing 12 of FIG. 1 showing cut line 1—1 through the indentation 18 on the cover 14, and cut line 2—2 through the flange 24. FIG. 4 is a cross-sectional view of the housing 12 through cut line 1—1 of FIG. 3 showing the latch 20 attached to an inner portion of the housing 12. A cross-sectional view of the battery 30 is shown in the compartment 28 of the housing 12.

Figure 5:
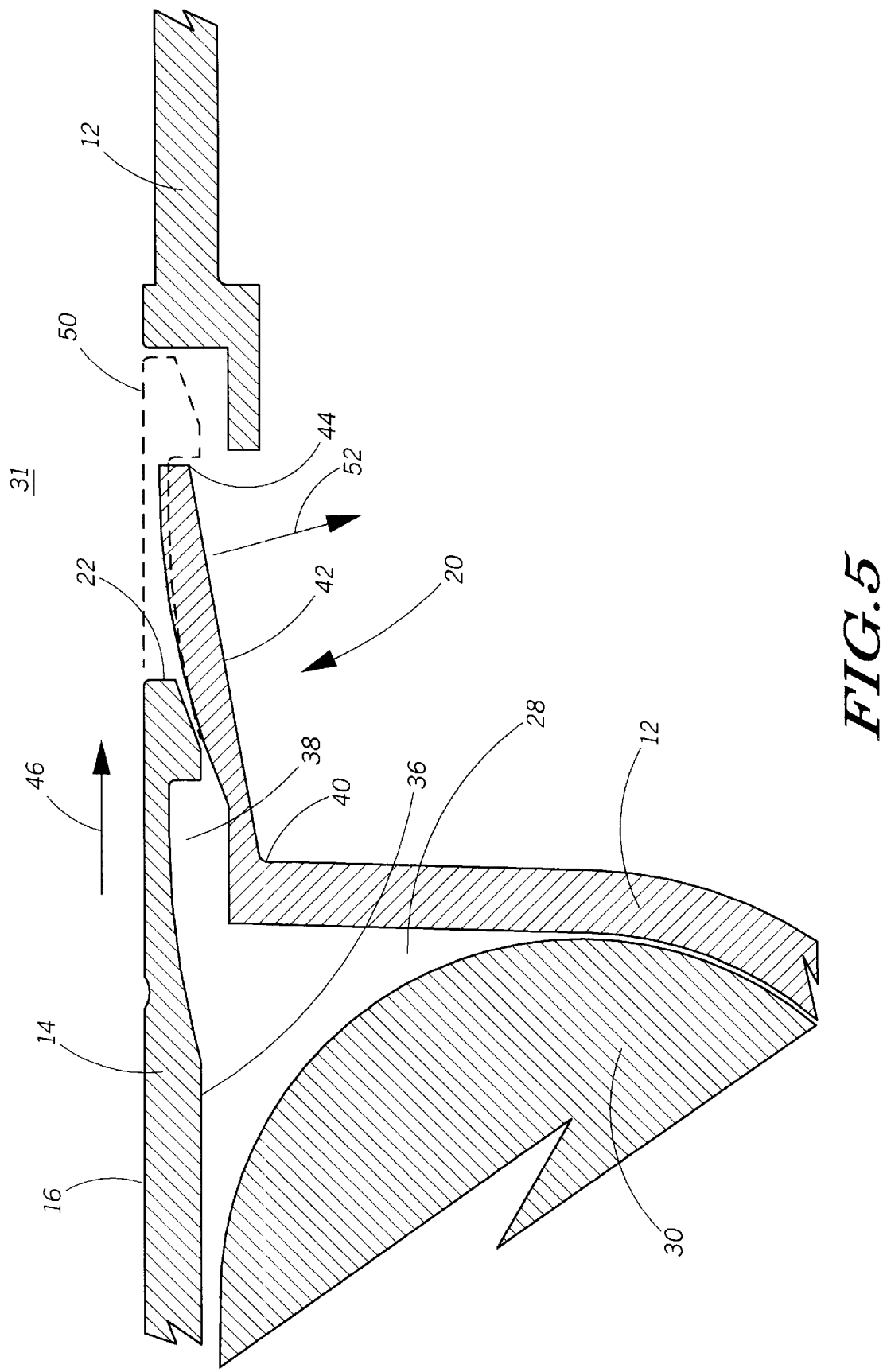
FIG. 5 is an enlargement of the cross-sectional view of FIG. 4 showing details of a latch when the cover is partially open.

FIG. 5 is an enlargement of area 31 of the cross-sectional view of FIG. 4 showing details of the latch 20 when the cover 14 is partially open. As will be more fully explained below, the resting position of the latch 20 when the cover 14 is in the opened position or in the partially opened position shown in FIG. 5, differs from the position of the latch when the cover is in the closed position, and also differs from the position of the latch when the cover is being unlatched. The cover has an inner surface 36 and a notch 38 on the inner surface near the leading edge 22. The latch comprises a base 40 integrally molded to the housing 12, a cantilevered beam 42 integrally molded to the base, and an engagement end 44 distal from the base. The engagement end 44 mates with the notch 38 when the cover 14 is in the closed position thereby preventing movement of the cover toward the open position. The phantom lines 50 indicate the position of the cover when it is in the closed position. Movement of the cover 14 in the direction indicated by arrow 46 from the position shown in FIG. 5 to the closed position causes the leading edge 22 of the cover to slide against the cantilevered beam 42. It should be appreciated from the phantom lines 50 that as the cover moves from the opened position to the closed position, the cover slides against the cantilevered beam 42, and the cover causes the cantilevered beam to deflect in the direction indicated by the arrow 52. Therefore, it should be appreciated that the resting position of the latch 20 shown in FIG. 5 is the position of the latch when there are no forces on the latch, such as a force from the cover or from a user of the portable electronic device.

Figure 6:
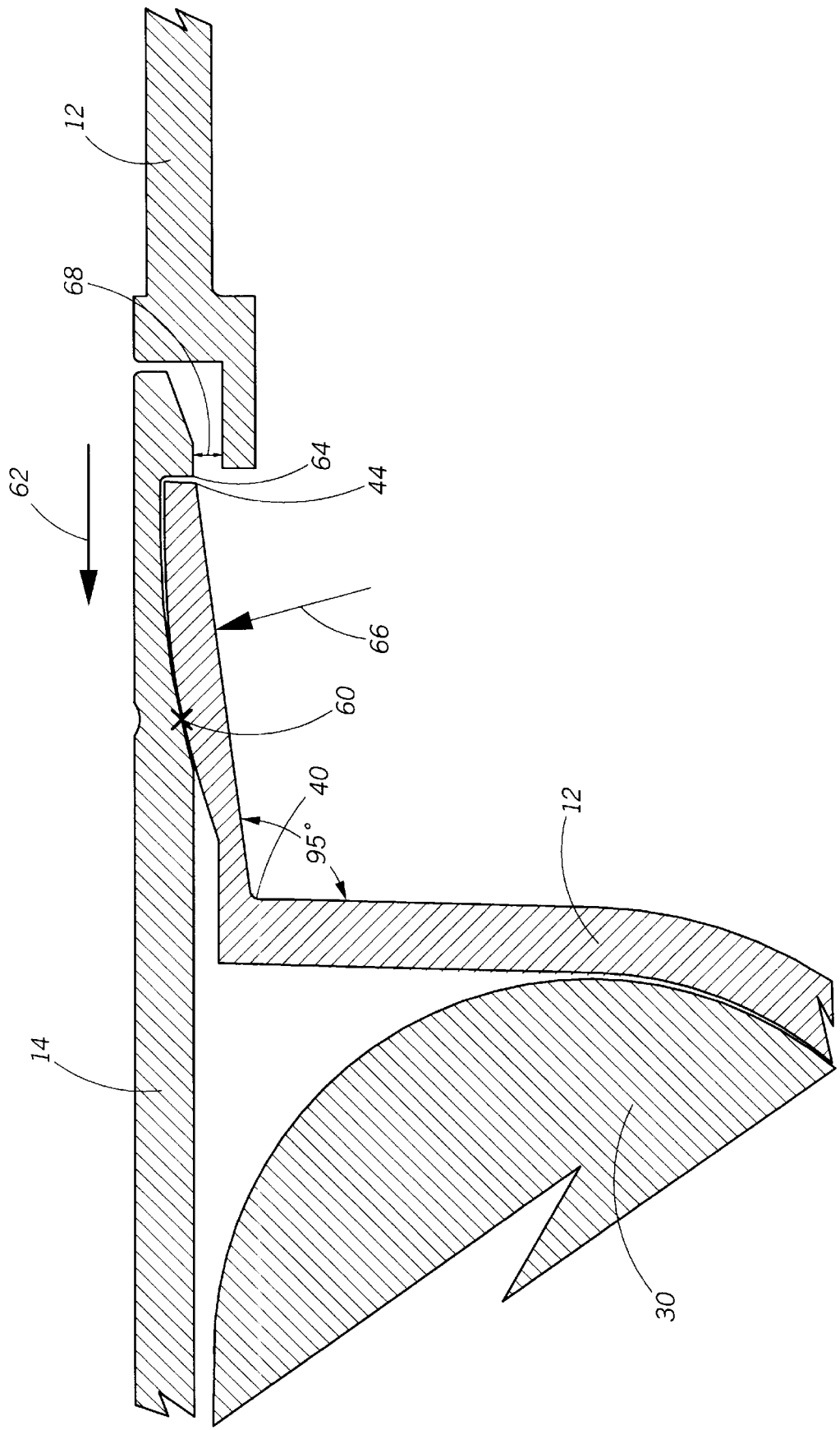
FIG. 6 is an enlargement of the cross-sectional view of FIG. 4 showing details of the latch when the cover is closed and latched.

FIG. 6 is an enlargement of area 31 of the cross-sectional view of FIG. 4 showing details of the latch 20 when the cover 14 is in the closed position and latched. When the cover is latched, it cannot separate from the housing 12 without a force being applied in a certain direction, as explained more fully infra. Of course, when the cover is latched, it restrains the contents (e.g., a battery 30) of the compartment 28 from leaving the confines of the compartment through the opening 17. When the cover is in the closed position, the latch is in contact with an area of contact 60 on the inside surface of the cover. The indentation 18 is on the outside surface of the cover 14 at a location approximately opposite the location of the area of contact 60 on the inside surface of the cover. When the cover is in the closed position, the engagement end 44 of the latch and a portion of the cantilevered beam near the engagement end, occupy the notch. The engagement end of the latch and the aforesaid portion of the cantilevered beam enter the notch because the latch automatically tends to return to its resting position, as shown in FIG. 5, when given the opportunity due to a natural resiliency of the plastic. When the cover is in the closed and latched position, the latch prevents movement of the cover in the direction indicated by arrow 62. Movement in the direction indicated by arrow 62 is prevented because the engagement end of the latch blocks movement of a mating end 64 of the notch. Any application to the cover of an external force having a component only in the direction indicated by arrow 62 causes the engagement end to move in the direction indicated by arrow 66, thereby keeping the engagement end in the notch, and thereby keeping the cover latched. Application to the cover of the external force having a component only in the direction indicated by arrow 62 causes the engagement end 44 to rotate about the base 40 of the latch 20. Rotation of the engagement end of the latch in the direction indicated by arrow 66 does not, however, cause the notch in the cover to move in a similar direction as will be explained, infra.

Figure 7:
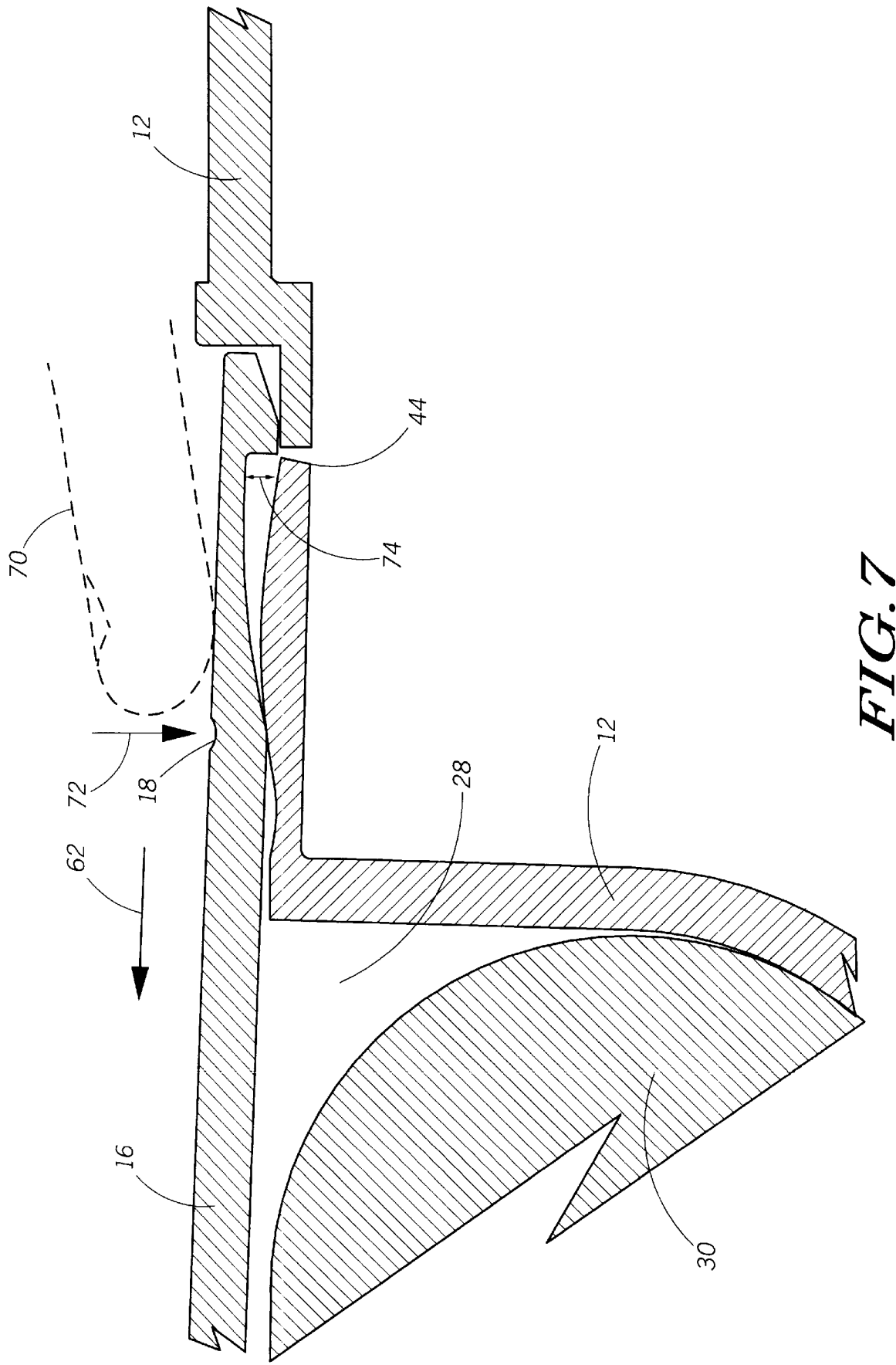
FIG. 7 is an enlargement of the cross-sectional view of FIG. 4 showing details of the latch when the cover is being unlatched.

FIG. 7 is an enlargement of area 31 of the cross-sectional view of FIG. 4 showing details of the latch 20 when the cover 14 is being unlatched. It should be appreciated that, typically, the cover is unlatched by application of an external force, such as by a finger 70 of a user of the portable electronic device. Application of the external force having a component in the direction indicated by arrow 72 causes a displacement of the cover, that is, a translational movement in the cover, in the same direction in an amount approximately the size of a gap 68 (see FIG. 6). The translational movement of the cover in the direction indicated by arrow 72 imparts rotational movement to the cantilevered beam 42 about the base 40. The translational movement of the cover 14 near the area of contact 60 in the direction toward the compartment 28 in an amount of a certain distance causes movement of the engagement end 44 in an amount of approximately twice the certain distance. The notch has a depth 74, preferably, with a measurement of approximately the same as the measurement of the size of the gap 68. Preferably, movement (in the direction of arrow 72) of the area of contact 60 in an amount of approximately half the size of the gap causes movement (out of the notch) of the engagement end of the latch in an amount of approximately the size of the gap. Preferably, the cosmetic feature, such as the indentation 18, suggests, such as by an arrow, movement toward the opened position in the direction indicated by arrow 62. As a result, the user is instructed to apply the external force such that it has components of force in both the direction of arrow 72 and the direction of arrow 62. Simultaneous application of such external forces affects removal of the engagement end of the latch out of the notch and also slides the cover toward the opened position.

Figure 8:
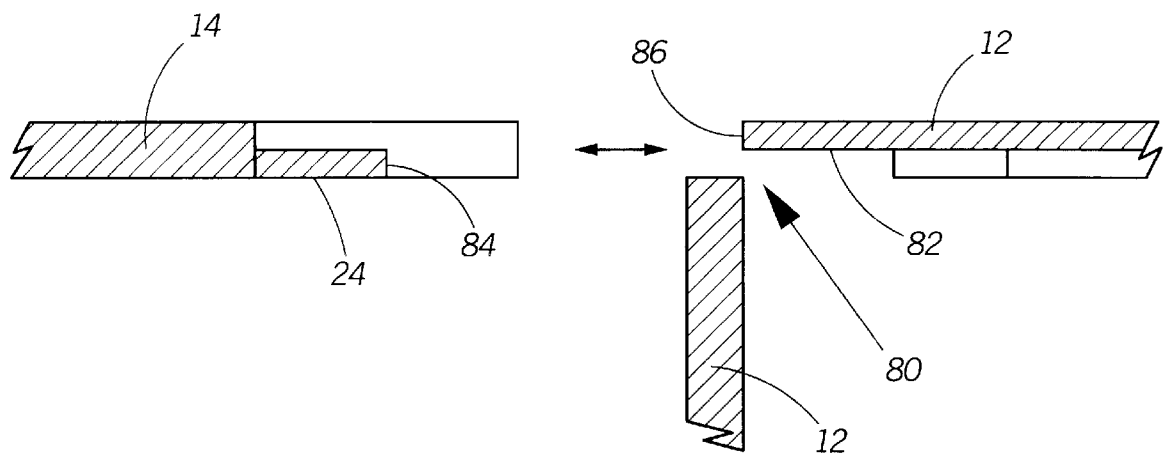
FIG. 8 is an enlarged cross sectional view of the housing through cut line 2—2 of FIG. 3 when the cover is partially open.

FIG. 8 is an enlarged cross sectional view of the housing 12 through cut line 2—2 of FIG. 3 when the cover 14 is partially opened, thereby producing an opening 17 and exposing the contents of the compartment 28, such as the battery 30. A flange 24 and a flange 26 are attached to the inside surface of the leading edge of the cover. Flange 24 and flange 26 are substantially identical; therefore, only flange 24 will be described in further detail. Flange 24 protrudes from the leading edge of the cover for insertion within the housing. The housing has a provision, such as through an opening 80, for insertion of the flange 24 on an interior surface 82 of side 15 of the housing 12. The flange 24 extends beyond the leading edge 22 of the cover 14, by a sufficient amount so that, as the cover is being closed, a tip 84 of the flange slides under a matching edge 86 of the housing immediately prior to the engagement end 44 making contact with the cantilevered beam 42. As a result, as the cover is moved from the opened position to the closed position, the cover 14 remains within a plane formed by side 15, and the cover is not forced out of that plane by the cantilevered beam; rather, the cantilever beam gives way. As the cover is fully closed (see FIG. 6), the engagement end of the latch rotates into the notch, but the resilience of the latch does not cause the cover to move out of the plane formed by side 15 because of the interaction of the flange with interior surface 82 of side 15 of the housing. When the cover is in the closed position, flange 24 and housing 12 continue to cooperate to retain within the compartment its contents. Of course a cover for use with a latch in accordance with the invention has additional flanges in order to retain within the compartment its contents, but the additional flanges play no role in the invention.

Advantageously, the force required to disengage the latch and remove the cover occurs naturally when the user attempts to slide the cover from its latched position. This is because a user naturally applies a force having two components—one component toward the latch and another component toward the opened position. The invention is designed to utilize this combination of forces to both disengage the latching mechanism and remove the cover simultaneously.

Advantageously, application of an external force on the cover in a direction only toward an opened position (i.e., no force in a direction toward the latch) causes the latch to engage the cover with more force due to geometry of the latch. Preferably, the cantilevered beam 42 of the latch 20 is angled upward into the notch such that the angle between the cantilevered beam and the housing at the base of the latch (see FIG. 6) is approximately 95 degrees. During an accidental disengagement, such as when a portable electronic device 10 is dropped, an acceleration force due to inertia usually result only in a component of force directed along the direction of removal, arrow 62 in FIG. 7. Advantageously, when a portable electronic device 10 having a latch 20 in accordance with the invention is dropped, the latch will not disengage. As the acceleration force is increased, an engagement force in the direction of arrow 66, advantageously, also increases due to the structure of the latch.

While a detailed description of the preferred embodiment has been given, it should be appreciated that many variations can be made thereto without departing from the scope of the invention as set forth in the claims.

What is claimed is:

1. A latch for a portable electronic device having a housing, the housing having a compartment with an opening, and a cover, the cover moveable into a closed position for covering the opening into into an opened position for exposing the opening, the cover having an inside surface and an outside surface with a notch on the inside surface, comprising:

a base integrally molded to the housing:

a cantilevered beam integrally molded to the base, wherein the cantilevered beam rotates relative to the base as the cover is moved from the opened position to the closed position, and an engagement end distal from the base, the engagement end for mating with the notch when the cover is in the closed position thereby preventing movement of the cover toward the opened position, wherein the cantilevered beam is rotable relative to the base when an external force applied at the outside surface of the cover is in a direction toward the latch, and wherein the latch releases the cover for movement from the closed position toward the opened position when a displacement of the cover in a direction toward the compartment resultant from the external force is sufficient to rotate the engagement end out of the notch.

2. The latch of claim 1 wherein the latch releases the cover for movement from the closed position toward the opened position when rotational movement of the cantilevered beam is sufficient to rotate the engagement end out of the notch.

3. The latch of claim 1 wherein the displacement of the cover in the direction toward the compartment in an amount of a certain distance causes movement of the engagement end in an amount of approximately twice the certain distance.

4. A latch for a portable electronic device having a housing, the housing having a compartment with an opening, and a cover, the cover moveable into a closed position for covering the opening and into an opened position for exposing the opening, the cover having an inside surface and an outside surface with a notch on the inside surface, comprising
  a base integrally molded to the housing;
  a cantilevered beam integrally molded to the base, wherein the cantilevered beam rotates relative to the base as the cover is moved from the opened position to the closed position; and
  an engagement end distal from the base, the engagement end for mating with the notch when the cover is in the closed position thereby preventing movement of the cover toward the opened position, wherein the cantilevered beam is rotable relative to the base when an external force applied at the outside surface of the cover is in a direction toward the latch, and wherein the latch releases the cover for movement from the closed position toward the opened position when the external force is sufficient to rotate the engagement end out of the notch.

5. The latch of claim 4 wherein the latch releases the cover for movement from the closed position toward the opened position when a displacement resultant from the external force is sufficient to rotate the engagement end out of the notch.

6. A portable electronic device comprising:
  a housing having a compartment with an opening;
  a cover, the cover moveable into a closed position for covering the opening and into an opened position for exposing the opening, the cover having an inside surface and an outside surface and a notch on the inside surface;
  a latch for securing the cover to the housing when the cover is in the closed position, the latch comprising:
    a base integrally molded to the housing,
    a cantilevered beam integrally molded to the base; and
    an engagement end distal from the base, the engagement end for mating with the notch when the cover is in the closed position thereby preventing movement of the cover toward the opened position, wherein the cantilevered beam is rotable relative to the base when an external force applied at the outside surface of the cover is in a direction toward the latch, and wherein the inside surface of the cover is in contact with the cantilevered beam at an area of contact on the cantilevered beam when the cover is in the closed position, the area of contact being relatively near the base and relatively far from the engagement end, and wherein sliding movement of the cover from the opened position to the closed position imparts via the area of contact a rotational movement to the cantilevered beam.

7. The portable electronic device of claim 6 wherein the cantilevered beam rotates relative to the base as the cover is moved from the opened position to the closed position.

8. The portable electronic device of claim 6 including a flange attached to the inside surface of the cover and protruding from a leading edge of the cover for insertion within the housing, the flange and the housing cooperating to prevent the latch from causing movement of the cover in a direction away from the compartment as the cover is moved from the opened position to the closed position.

9. The portable electronic device of claim 6 including a flange attached to the inside surface of the cover and protruding from a leading edge of the cover for insertion within the housing, the flange and the housing cooperating to maintain the contact between the inside surface of the cover and the cantilevered beam when the cover is in the closed position.

10. The portable electronic device of claim 9 wherein translational movement of the cover in a direction of the compartment imparts via the area of contact a rotational movement to the cantilevered beam.

11. The portable electronic device of claim 10 wherein the latch releases the cover for movement from the closed position toward the opened position when a displacement resultant from the external force is sufficient to rotate the engagement end out of the notch.

12. The portable electronic device of claim 10 wherein the latch releases the cover for movement from the closed position toward the opened position when the rotational movement of the cantilevered beam is sufficient to rotate the engagement end out of the notch.

13. The portable electronic device of claim 10 wherein the translational movement of the cover near the area of contact in the direction toward the compartment in an amount of a certain distance causes movement of the engagement end in an amount of approximately twice the certain distance.

14. A portable electronic device comprising:
  a housing having a compartment with an opening;
  a cover, the cover moveable into a closed position for covering the opening and into an opened position for exposing the opening, the cover having an inside surface and an outside surface and a notch on the inside surface;
  a latch for securing the cover to the housing when the cover is in the closed position, the latch comprising:
    a base integrally molded to the housing,
    a cantilevered beam integrally molded to the base: and
    an engagement end distal from the base, the engagement end for mating with the notch when the cover is in the closed position thereby preventing movement of the cover toward the opened position, wherein the cantilevered beam is rotatable relative to the base when an external force applied at the outside surface of the cover is in a direction toward the latch, wherein the latch releases the cover for movement from the closed position toward the opened position when the external force is sufficient to rotate the engagement end out of the notch.

15. The portable electronic device of claim 14 wherein the latch releases the cover for movement from the closed position toward the opened position when a displacement resultant from the external force is sufficient to rotate the engagement end out of the notch.

16. The portable electronic device of claim 14 wherein the cantilevered beam rotates relative to the base as the cover is moved from the opened position to the closed position.

17. The portable electronic device of claim 14 including a flange attached to the inside surface of the cover and protruding from a leading edge of the cover for insertion within the housing, the flange and the housing cooperating to prevent the latch from causing movement of the cover in a direction away from the compartment as the cover is moved from the opened position to the closed position.

* * * * *

UNITED STATES PATENT AND TRADEMARK OFFICE
CERTIFICATE OF CORRECTION

PATENT NO : 5,848,719
DATED     : December 15, 1998
INVENTOR(S): Goldenberg

It is certified that error appears in the above-identified patent and that said Letters Patent is hereby corrected as shown below:

Please amend the claims as follows:

Column 4, line 57, change first occurrence of "into" to --and--.

Signed and Sealed this

Thirtieth Day of November, 1999

Q. TODD DICKINSON

Attest:

Attesting Officer

Acting Commissioner of Patents and Trademarks